US006248477B1

(12) United States Patent
Howard, Jr. et al.

(10) Patent No.: US 6,248,477 B1
(45) Date of Patent: Jun. 19, 2001

(54) CATHODE INTERCALATION COMPOSITIONS, PRODUCTION METHODS AND RECHARGEABLE LITHIUM BATTERIES CONTAINING THE SAME

(75) Inventors: Wilmont Frederick Howard, Jr.; Stephen Wilfred Sheargold, both of Edmond; Monte Sean Jordan; Joe Lane Bledsoe, both of Oklahoma City, all of OK (US)

(73) Assignee: Kerr-McGee Chemical LLC, Oklahoma City, OK (US)

( * ) Notice: Subject to any disclaimer, the term of this patent is extended or adjusted under 35 U.S.C. 154(b) by 0 days.

(21) Appl. No.: 09/408,043

(22) Filed: Sep. 29, 1999

(51) Int. Cl.$^7$ ...................................................... H01M 4/50
(52) U.S. Cl. .................. 429/224; 429/231.1; 429/231.4; 429/231.8; 429/231.95; 429/324; 429/340; 429/341; 423/592; 423/595
(58) Field of Search ................................ 429/224, 231.1, 429/231.4, 231.8, 231.95, 324, 340, 341; 423/592, 595

(56) References Cited

U.S. PATENT DOCUMENTS

| 5,240,794 | 8/1993 | Thackeray et al. | 429/224 |
|---|---|---|---|
| 5,296,318 | 3/1994 | Gozdz et al. | 429/192 |
| 5,316,877 | 5/1994 | Thackeray et al. | 429/197 |
| 5,460,904 | 10/1995 | Gozdz et al. | 429/192 |
| 5,609,975 | 3/1997 | Hasegawa et al. | 429/217 |
| 5,631,104 | 5/1997 | Zhong et al. | 429/194 |
| 5,677,087 | 10/1997 | Amine et al. | 429/224 |
| 5,702,679 | 12/1997 | Sheargold et al. | 423/599 |
| 5,738,957 | 4/1998 | Amine et al. | 429/223 |
| 5,783,332 | 7/1998 | Amine et al. | 429/218 |
| 5,866,279 | 2/1999 | Wada et al. | 429/224 |
| 5,869,208 | 2/1999 | Miyasaka | 429/224 |

FOREIGN PATENT DOCUMENTS

| 0 885 845 A1 | 12/1998 | (EP) . |
|---|---|---|
| WO 95/34919 | 12/1995 | (WO) . |
| WO 96/10538 | 4/1996 | (WO) . |
| WO 97/37394 | 10/1997 | (WO) . |
| WO 98/38648 | 9/1998 | (WO) . |
| WO 98/56057 | 12/1998 | (WO) . |
| WO 99/00329 | 1/1999 | (WO) . |

OTHER PUBLICATIONS

Publication entitled A Study On LiM$_x$Mn$_{2-x}$O$_4$ (M=Co, Ni, Al, Ti) As Positive Electrode Materials For Lithium Secondary Batteries by Bito et al., *Proc. Electrochem. Soc.*, vol. 23, pp. 461–472 (1993).
Publication entitled Composite Solid Electrolyte For Li Battery Applications by Nagasubramanian et al., *Solid State Ionics*, vol. 67, pp. 51–56 (1993).
Publication entitled Improved Capacity Retention In Rechargeable 4 V Lithium/Lithium–Manganese Oxide (Spinel) Cells by Gummow et al., *Solid State Ionics*, vol. 69, pp. 59–67 (1994).
Publication entitled A New Class Of Advanced Polymer Electrolytes And Their Relevance In Plastic–Like, Rechargeable Lithium Batteries by Appetecchi et al., *J. Electrochem. Soc.*, vol. 143, pp. 6–12 (1996).
Publication entitled Quality Control Of Li$_{1+\delta}$Mn$_{2-\delta}$O$_4$ Spinels With Their Impurity Phases By Jaeger And Vetter Titration by Kelder et al., *J. Power Sources*, vol. 68, pp. 590–592 (1997).
Publication entitled The Influence Of Dopants On The Electrochemical Behavior Of Lithium Manganese Spinel by Wohlfahrt–Mehrens et al., *Proc. Electrochem. Soc.*, vol. 18, pp. 192–198 (1997).
Publication entitled Doped Li–Mn Spinels: Physical/Chemical Characteristics And Electrochemical Performance In Li Batteries by Pistoia et al., *Chem. Mater.*, vol. 9, pp. 1443–1450 (1997).
Publication entitled The Cr–Substituted Spinel Mn Oxides LiCr$_y$Mn$_{2-y}$O$_4$ ($0 \leq y \leq 1$): Rietveld Analysis Of The Structure Modification Induced By The Electrochemical Lithium Deintercalation by Sigala et al., *J. Solid State Chem.*, vol. 132, pp. 372–381 (1997).
Publication entitled M$^{3+}$–Modified LiMn$_2$O$_4$ Spinel Intercalation Cathodes by Robertson et al., *J. Electrochem. Soc.*, vol. 144, pp. 3505–3512 (1997).
Publication entitled Optimization Of Spinel Li$_{1+x}$Mn$_{2-y}$O$_4$ As A 4 V Li–Cell Cathode In Terms Of A Li–Mn–O Phase Diagram by Xia et al., *J. Electrochem. Soc.*, vol. 144, pp. 4186–4194 (1997).
Publication entitled First–Principles Prediction Of Insertion Potentials In Li–Mn Oxides For Secondary Li Batteries by Aydinol et al., *J. Electrochem. Soc.*, vol. 144, pp. 3832–3835 (1997).
Publication entitled Application Of AB Initio Methods To Secondary Lithium Batteries by Aydinol et al., *Mat. Res. Soc. Symp. Proc.*, vol. 496, pp. 65–75 (1998).
Publication entitled The Effect Of Multivalent Cation Dopants On Lithium Manganese Spinel Cathodes by de Kock et al., *J. Power Sources*, vol. 70, pp. 247–252 (1998).
Publication entitled The Spinel Phases LiAl$_y$Mn$_{2-y}$O$_4$ (y=0, 1/12, 1/9, 1/6, 1/3) And Li(Al,M)$_{1/6}$Mn$_{11/6}$O$_4$ (M=Cr, Co) As The Cathode For Rechargeable Lithium Batteries by Song et al., *Solid State Ionics*, vol. 117, pp. 151–156 (1999).

*Primary Examiner*—Laura Weiner
(74) *Attorney, Agent, or Firm*—C. Clark Dougherty, Jr.

(57) ABSTRACT

Intercalation compositions having spinel structures with crystallites of metal oxides (M$_2$O$_3$) dispersed throughout the structure are provided having the general formula Li$_{1+x}$M$_y$Mn$_{2-x-y}$O$_4$. Methods of producing the intercalation compositions and rechargeable lithium batteries containing the compositions are also provided.

38 Claims, 3 Drawing Sheets

CATHODE INTERCALATION COMPOSITIONS, PRODUCTION METHODS AND RECHARGEABLE LITHIUM BATTERIES CONTAINING THE SAME

FIELD OF THE INVENTION

This invention relates to intercalation compositions for use as active cathode ingredients in rechargeable lithium batteries, and more particularly, to lithium manganese oxide spinel modified with one or more other metals, its preparation and use.

DESCRIPTION OF THE PRIOR ART

Lithium cobalt oxide has heretofore been utilized as the positive electrode material in commercial four volt rechargeable lithium batteries. Because of their lower cost, environmental friendliness, ease of production and equivalent performance, lithium manganese oxide intercalation compositions have been considered for use as cathode active materials in rechargeable lithium and lithium-ion batteries. The term "intercalation" indicates the ability of the composition to reversibly accommodate guest ions, typically alkali metal ions. A problem that has been encountered in the use of lithium manganese oxide intercalation compositions in batteries has been less than satisfactory performance, especially capacity fade which has been deemed unsatisfactory for today's stringent requirements. The term "capacity" as used herein means the initial discharge capacity of a cathode active material utilized in a rechargeable lithium battery. The term "capacity fade" or "cycle fade" is used herein to mean the decrease in capacity with each cycle, i.e., with each recharge and discharge.

It was established by Gummow et al. [Solid State Ionics 69, 59 (1994)] that stoichiometric $LiMn_2O_4$ is an unsuitable cathode ingredient due to its chemical and physical degradation resulting in rapid capacity fade. Thackeray et al. [U.S. Pat. No. 5,316,877 issued May 31, 1994] taught that materials of the formula $Li_1D_{x/b}Mn_{2-x}O_{4+\delta}$ (wherein x is less than 0.33, D is a mono-or multi-valent metal cation, b is the oxidation state of D and $\delta$ is the fraction required to produce electroneutrality of the compound) would have enhanced stability but reduced discharge capacity. This deficiency in discharge capacity is noted in most subsequent papers or patents describing doped or modified lithium manganese oxide spinels.

Recent publications which define the preparation and performance of multivalent metal cation (M) doped lithium manganese oxide cathode materials include de Kock et al. [J. Power Sources 70, 247 (1998)], Iwata et al. [E.P. No. 885,845 (Dec. 23, 1998)], Heider et al. [W.O. 99/00329 (Jan. 7, 1999)], Pistoia et al. [W.O. 97/37394 (Oct. 9, 1997)] and Miyasaka [U.S. Pat. No. 5,869,208 issued on Feb. 9, 1999]. Preparations which are representative of those described in the above publications require an intimate mixing, usually by ball milling, of the reaction precursers, followed by an extended reaction at temperatures up to 900° C., generally with multiple calcining and grinding steps. The objective of the multiple calcining and grinding steps is to insure a complete reaction with no detectible by-products such as M oxides, $Mn_2O_3$ or $Li_2MnO_3$ in the spinel product. The by-product impurities are believed to reduce reversible capacity and contribute to the destabilization of the working battery system. An alternate method [Hemmer et al., W.O. 96/10538 (Apr. 11, 1996)] requires the dissolution and mixing of precurser metal salts which results in mixing at the atomic level. The solvent is subsequently removed prior to thermal treatment.

The theoretical initial discharge capacity of lithium manganese oxide ($LiMn_2O_4$) is 148 mAh/g, but the lattice disorders formed during calcining restrict the availability of intercalation channels, and as a result, initial discharge capacities rarely exceed 130 mAh/g. Unacceptable capacity fade, i.e., fade rates of up to 0.5% per cycle at room temperature, are also characteristic. Excess lithium in the spinel as taught by Thackeray et al. [U.S. Pat. No. 5,316,877 issued May 31, 1994], reduces the capacity fade rate, but it also reduces the capacity. Since lithium (as $Li_2O$) is an excellent flux, the additional lithium serves to facilitate the reaction by enhancing reactant cation mobility, thus facilitating the formation of intercalation channels, and capacities closer to theoretical are obtained. Wada et al., [U.S. Pat. No. 5,866,279 issued Feb. 2, 1999] teach that lithium manganese oxide with 3.2 mole % extra lithium will produce 121 mAh/g (122 mAh/g calculated) with only 0.025%/cycle fade.

When a second metal ion modifier (other than lithium) is added to the spinel lattice, a further reduction in capacity is observed, although stability may be enhanced. For example, $Li_{1.06}Cr_{0.1}Mn_{1.84}O_4$ is listed with 108 mAh/g initial capacity (114 mAh/g calculated) and 0.025%/cycle fade [Iwata et al., E.P. 885,845 (Dec. 23, 1998)], but $Li_{1.02}M_{0.05}Mn_{1.93}O_4$ materials have approximately 0.3%/cycle fade without a protective coating [Miyasaka [U.S. Pat. No. 5,869,208 issued on Feb. 9, 1999]. Phase-pure $Li_{1.01}Al_{0.01}Mn_{1.98}O_4$ described by de Kock et al. [J. Power Sources 70, 247 (1998)] produced only 103 mAh/g (146 mAh/g calculated), but had less than 0.03%/cycle capacity fade. The same is true for multiple dopants, i.e., low capacity with low cycle fade, as described in Faulkner et al., [W.O. 98/38648 (Sep. 3, 1998)]. Secondary rechargeable lithium batteries have a broad application in the automotive and other similar industries where the batteries must withstand operations and storage at temperatures up to 65° C. The various publications cited above do not mention whether or not the cathode active materials described are thermally stable, i.e., capable of operating or being stored in the 40° C. to 65° C. range without quickly losing the stated performance characteristics.

Thus, there are continuing needs for improved lithium manganese oxide intercalation materials which can serve as active cathode ingredients in secondary rechargeable lithium or lithium ion batteries having high initial capacities and low cycle fades while operating or being stored at temperatures up to about 65° C.

SUMMARY OF THE INVENTION

The present invention provides metal cation-modified lithium manganese oxide cathode intercalation compositions, methods of preparing the compositions and secondary rechargeable lithium or lithium-ion batteries containing the compositions as active cathode ingredients which meet the needs described above and overcome the above mentioned deficiencies of the prior art. The cathode intercalation compositions of this invention are basically comprised of a trivalent metal cation-modified lithium manganese oxide composition having a spinel structure and having the general formula $Li_{1+x}M_yMn_{2-x-y}O_4$ with crystallites of $M_2O_3$ dispersed throughout the structure wherein x is a number greater than 0 but less than or equal to 0.25, M is one or more trivalent metal cations, y is a number greater than 0 but less than or equal to 0.5 and a portion of M is in the crystallites of $M_2O_3$. The trivalent metals which can be utilized in the intercalation compositions of this invention include one or more of aluminum, chromium, gallium, indium and scandium.

The methods of preparing the above described lithium manganese oxide intercalation compositions of the above formula are basically comprised of intimately mixing particulate solid reactants comprised of lithium, manganese and one or more of the above described trivalent metals in the form of oxides, thermally decomposable salts or mixtures thereof in amounts based on the above formula. The resulting intimately mixed reactants are introduced into a reactor, and the mixed reactants are heated in the reactor, preferably while continuously being agitated, in the presence of air or an oxygen enriched atmosphere at a temperature in the range of from about 550° C. to about 850° C. for a time period of up to about 48 hours. Thereafter, the reacted product formed is gradually cooled to a temperature of less than about 500° C.

The improved secondary rechargeable lithium or lithium-ion battery of this invention is comprised of a lithium ion receptive anode and a lithium intercalation cathode coupled together in an electrochemical cell housing by an electrolyte containing an electrolytically stable lithium salt, said lithium intercalation cathode being comprised of a composition having a spinel structure of the above formula.

Thus, it is a general object of the present invention to provide improved cathode intercalation compositions, production methods and improved rechargeable lithium or lithium ion batteries containing the intercalation compositions.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Figure 1:
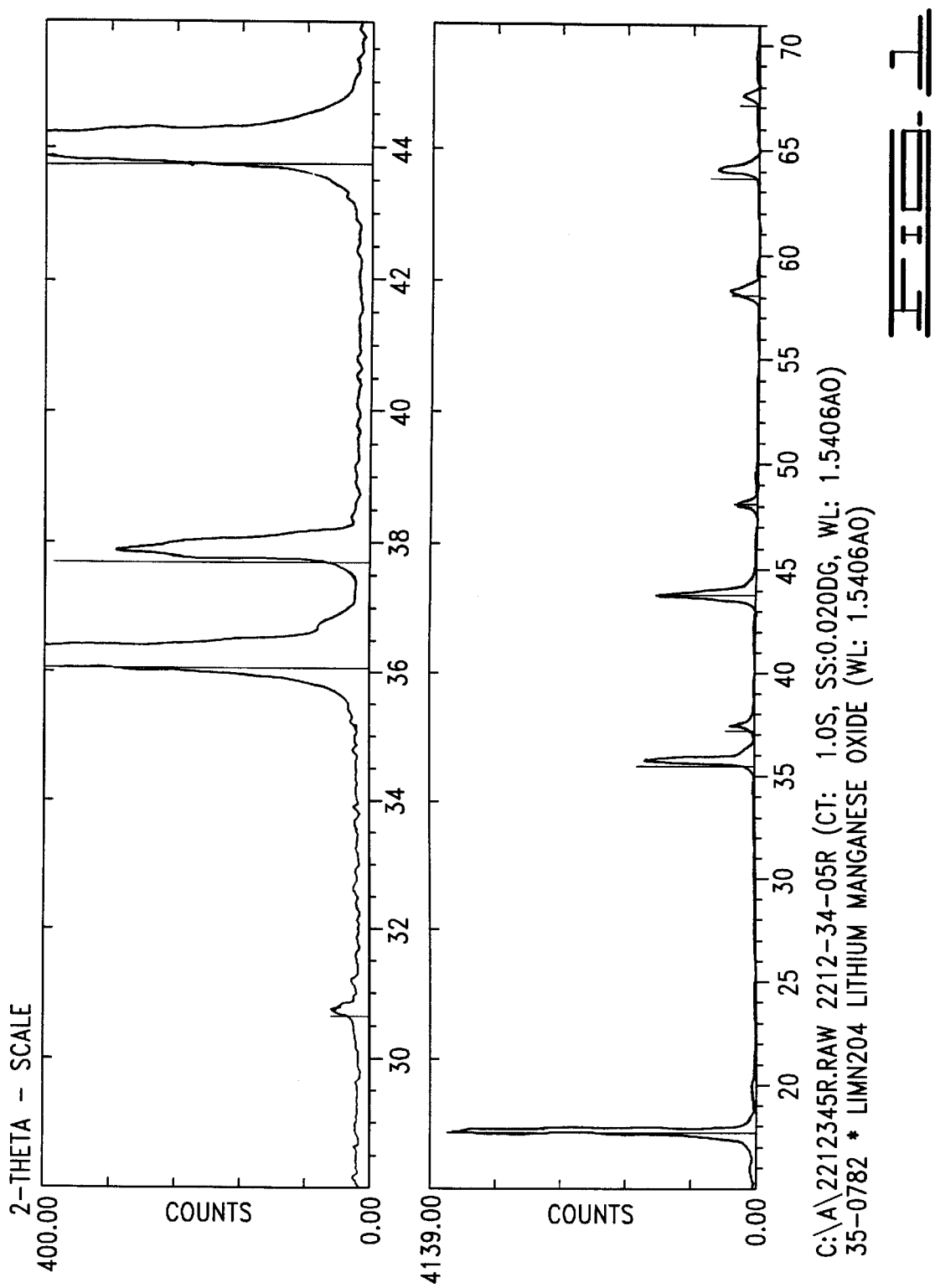
FIG. 1 is an x-ray diffraction pattern of standard lithium manganese oxide spinel C having the formula $Li_{1.07}Mn_{1.93}O_4$ (and having the properties set forth in Tables III and IV) in which the vertical lines are computer generated positions for stoichiometric $LiMn_2O_4$.

The present invention provides novel intercalation compositions for use as the active cathode ingredients in rechargeable lithium or lithium-ion batteries. The cathode intercalation compositions of this invention have excellent discharge capacities which are greater or at least substantially equal to calculated discharge capacities and reduced capacity fades per cycle at temperatures up to about 65° C. The present invention also provides methods of producing the intercalation compositions and rechargeable lithium or lithium-ion batteries containing the intercalation compositions.

The cathode intercalation compositions of this invention are of the general formula $Li_{1+x}M_yMn_{2-x-y}O_4$ and have spinel structures with crystallites of $M_2O_3$ dispersed throughout the structures wherein x is a number greater than 0 but less than or equal to 0.25, M is one or more trivalent metals, y is a number greater than 0 but less than or equal to 0.5 and a portion of M is in said crystallites of $M_2O_3$.

While M in the above formula can be any of several trivalent metal cations that will adapt to the spinel structure in place of manganese, the optimum results (greater capacity, lower fade) are achieved only with those trivalent metal ions that do not have an easily attainable higher oxidation state. This precludes iron and cobalt, for example, but points to the Group IIIa and IIIb elements. While chromium is not one of such elements, it is suitable since the energy required to remove an additional electron is above the voltage plateau whereby trivalent manganese converts to a valence of 4. The lanthanide series of elements, all trivalent cations, and yttrium are unsuitable due to their large size which leads to lattice disorder and a propensity against the spinel structure. Similarly, boron is too small, and is a glass-former, not a crystallizing agent.

Thus, the trivalent metal cations which are suitable for use in accordance with the present invention (as M in the above referenced formula) and have a tendency toward octahedral ($O_h$) site occupation in the spinel lattice are one or more of aluminum, chromium, gallium, indium and scandium. These trivalent metal cations readily substitute for trivalent manganese and enhance the formation of spinels with minimum blockage or disorder of the intercalation channels. Of the various trivalent metal cations which can be used, aluminum is preferred.

The above described trivalent metal cations suitable for use as M in the above formula have certain chemical attributes which effectively stabilize the spinel composition of this invention during lithium extraction and reinsertion. First, they are spinel-formers, providing a template for the bulk lithium manganese oxide compound. Even though lithium manganese oxide is predisposed to the cubic spinel framework, the structure contains many non-spinel domains which are often not entirely eliminated by extended and uneconomical thermal treatment. The $\gamma$ phases of aluminum oxide ($Al_2O_3$) and gallium oxide ($Ga_2O_3$) are defect spinels that do not have atoms in the tetrahedral sites, and assist in the formation of the desired structure when included in the reactant mixture. Scandium oxide ($Sc_2O_3$) has a similar structure. Both chromium oxide ($Cr_2O_3$) and indium oxide ($In_2O_3$) are known spinel formers when reacted with cations having valences of 1 or 2, e.g., alkali metals, alkaline earth metals and transition metal oxides. The second property that the M trivalent metal cations of this invention have is stable +3 oxidation states without access to higher oxidation levels below 4.5 volt applied potential. Aluminum, gallium, indium and scandium cations have filled outer electron shells and are very resistant to further oxidation while chromium III has a filled half shell that offers good protection against electron removal up to about 4.7 volts. The high ionization energies of the M metals insure that they will not participate in the reduction/oxidation cycles with manganese which would cause structural degradation to the lattice channels. Thus, the fixed charge M metals of this invention minimize damage to the spinel lattice during electrochemical cycling.

Yet another attribute of the M metal cations of this invention is that they are resistant to dissolution by acids when they are in an oxide lattice. Since the M metal cations replaced manganese, there is a reduction in metal ion leaching from the lattice and subsequently, a more stable cathode material results. This stability reduces capacity fade and is especially desirable at elevated temperature operations, i.e., 45° C. to 65° C., where acid attack is accelerated.

As indicated above, a novel and unique characteristic of the cathode intercalation compositions of this invention is that on detailed Rietveld diffraction analysis, a second phase consisting of $M_2O_3$ metal oxide crystallites, typically of a size less than about 1,000 Angstroms and having spinel characteristics, are shown to be dispersed throughout the bulk spinel structure. These micro- or nano-size domains facilitate lithium ion conductivity through the spinel by allowing the ion to skip across the oxygen-rich particle surface. These metal oxide domains are not formed in lithium manganese oxide species prepared using solution-gel preparation techniques since metal dopants are readily incorporated into the crystal spinel lattice when the precursors are mixed on the atomic scale.

Additional advantages of the cathode intercalation compositions of this invention include an average particle size below about 50 microns and low surface area. Battery manufacturers prefer cathode materials of small particle sizes to avoid the problem of separator breach and subsequent cell failure. The low surface area of the material brings about improvement in handling during processing, improved storage capability and improved safety. The cathode materials include a stoichiometric excess of lithium and the one or more M cations which enhance storage and cycle life. The BET surface area of such cathode material is less than or equal to 2 square meters per gram and the tap density of the material is greater than or equal to 1.3 grams per cubic centimeter. It is anticipated that more extensive production processing will lower the surface areas and increase the densities of the cathode intercalation compositions of this invention as compared to the laboratory compositions described herein.

The intercalation compositions of this invention as described above are particularly suitable for use as active cathode ingredients in secondary rechargeable lithium batteries, most commonly with carbon anodes which are designated as lithium-ion batteries. As mentioned, the intercalation cathode compositions of this invention have high discharge capacities with low cycle fades and high resistance to degradation even at elevated temperatures that cause rapid capacity reduction in prior art compositions. The intercalation compositions also are of relatively low cost with minimal health and environmental risks.

The methods of preparing the cathode intercalation compositions of this invention, i.e., a composition having a spinel structure with crystallites of $M_2O_3$ dispersed throughout the structure and having the formula $Li_{1+x}M_yMn_{2-x-y}O_4$ wherein x is a number greater than 0 but less than or equal to 0.25, M is one or more trivalent metals, y is a number greater than 0 but less than or equal to 0.5 and a portion of M is in the crystallites of $M_2O_3$, are as follows. Particulate solid reactants comprised of lithium, manganese and one or more of the trivalent metals M in the form of oxides, thermally decomposable salts or mixtures thereof are intimately mixed in amounts based on the above intercalation composition formula. The resulting intimately mixed reactants are introduced into a reactor, and the mixed reactants are heated in the reactor while continuously agitating the reactants in air or an oxygen enriched atmosphere at a temperature in the range of from about 550° C. to about 850° C. for a time period of up to about 48 hours. Thereafter, the reacted product is gradually cooled to a temperature of less than about 500° C. As mentioned above, the one or more trivalent metals M are selected from aluminum, chromium, gallium, indium and scandium. Of these, aluminum is the most preferred.

The lithium, manganese and one or more of the trivalent metals M are preferably in the form of oxides or thermally decomposable salts as indicated above. The decomposable salts include, but are not limited to, nitrates, carbonates, hydroxides and carboxylates. In instances where the trivalent metal M oxides are unreactive, soluble salts of the trivalent metal can be dissolved in a suitable solvent. Manganese oxide is added to the solution and the slurry formed is then dried in a rotary evaporator or the like whereby the manganese oxide is infused with the trivalent metal salt. Thereafter, the dried salt is intimately mixed with lithium oxide or a thermally decomposable salt thereof.

The intimate mixing of the reactants can be performed utilizing various mixing apparatus including, but not limited to, a rod mill, a ball mill, a v-cone blender, a high shear blender or the like. The reactor or calciner utilized is preferably a rotary kiln which densifies the product and achieves the desired tap density, but other reactors such as box ovens, belt furnaces or the like can also be utilized. The blended reactants are introduced into the reactor by a suitable conveyor apparatus. The manganese reactant is preferably in the form of a particulate manganese oxide having an average particle size less than about 100 microns, more preferably less than 30 microns, at the temperature to which the manganese oxide is heated in the reactor. As set forth above, the reactants are heated in air or an oxygen enriched atmosphere in the reactor at a temperature in the range of from about 550° C. to about 900° C. A more preferred temperature range is from about 650° C. to about 850° C. and the most preferred temperature range is from about 700° C. to about 800° C. The atmosphere in the reactor preferably contains more than about 20% by volume of oxygen.

As indicated above, the reactants are heated in the calciner for a time period of up to about 48 hours. A more preferred time period is about 10 hours with a time period in the range of from about 2 hours to about 5 hours being most preferred. Finally, the reacted product is preferably cooled gradually over a period of from about 4 hours to about 6 hours to the final temperature of less than about 500° C. before the reaction product is removed from the reactor. After removal from the reactor, the reaction product is cooled to ambient temperature.

As mentioned above, the cathode intercalation materials are of the formula $Li_{1+x}M_yMn_{2-x-y}O_4$. A portion of the trivalent metal cation or cations M is present as oxide crystallites with spinel related structure dispersed throughout the bulk spinel lattice. The crystal lattice of a phase-pure material is a cubic spinel structure of space group Fd3m with lithium atoms in 8a lattice sites; manganese, excess lithium and the trivalent metal cation or cations in 16d sites; and oxygen atoms in 32c sites.

While the excess lithium in the intercalation composition serves to stabilize the composition against capacity fade, the accompanying reduction in initial capacity can render the composition unsuitable for its intended use. The inclusion of prior art dopants or modifiers, which have typically been metals or fluoride, has the same effect. The trivalent metals of the present invention, and particularly aluminum which is preferred, are not entirely incorporated into the crystal lattice, but as mentioned exist in part as domains of $M_2O_3$ separate from the lithium manganese oxide spinel phase.

These crystallites augment the lithium conductivity within the lattice, although the bulk oxides are not themselves conductive. This phenomenon has previously been documented in polymer electrolytes with powdered ceramic fillers by Appetecchi et al. [J. Electrochem. Soc. 143, 6 (1996)] and in multiphasic lithium metal oxide solid electrolytes by Nagasubramanian et al. [Solid State Ionics 67, 51 (1993)]. The oxygen-rich nanocrystallite surfaces facilitate the transport of lithium ions in a "water-bug" effect. The smaller the nanocrystallite particles are, the better the ionic conductivity of the bulk spinel lattice.

In the present invention, the $M_2O_3$ crystallites overcome the disorder in and the subsequent blockage of the spinel intercalation channels. In effect, a greater percentage of lithium is available for the intercalation process at less than 4.5 volts, including lithium from otherwise inaccessible octahedral 16d sites. This latter occurrence seemingly violates the upper oxidation state of manganese or the trivalent metals M in the system, but recent theoretical work by Aydinol and Ceder [J. Electrochem. Soc. 144, 3832 (1997)] and by Aydinol et al. [Mat. Res. Soc. Symp. Proc. 496, 65 (1998)] provide an explanation. In the presence of excess lithium or a modifier such as one or more trivalent metal cations M, the ionic environment around the manganese ion is increased, which is balanced by an increase in the covalent character of the oxygen electron cloud. The net effect allows oxygen electrons to participate in the electrochemical cycling process, resulting in higher than expected capacities (based on spinel stoichiometry). Phase-pure materials, as taught by the prior art, can not achieve the combination of high discharge capacity and low capacity fade exhibited by the present invention.

Several steps make up the reaction of lithium and manganese precursors to form lithium manganese oxide spinel ($LiMn_2O_4$). Assuming lithium oxide ($Li_2O$) and manganese oxide ($Mn_2O_3$) starting materials which are stable compounds at 500° C. in an oxidizing atmosphere and which will start to chemically react at that point, the reaction will proceed according to the following mechanism:

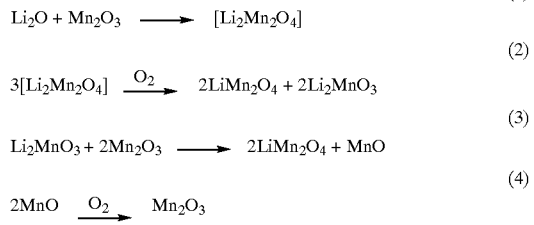

Since $Li_2O$ is the limiting reagent, the excess $Mn_2O_3$ is available for step (3) above. Iterative reactions (3) and (4) continue until either $Li_2MnO_3$ or $Mn_2O_3$ is exhausted. If the overall reaction is not carried to completion, both these species will be present as impurities in the product.

When a trivalent metal cation M in the form of an oxide or salt is added to the reactants, three additional products are possible, assuming M will occupy a 16c spinel site. An incomplete preparation will yield unreacted $M_2O_3$ or, alternatively, $Li_xMO_y$ that has been insufficiently annealed to form a solid solution with $Li_{1+x}Mn_2O_4$. When the reaction is completed, $Li_{1+x}M_yMn_{2-x-y}O_4$ spinel is yielded. Excess lithium (as $Li_2O$) acts as a flux which encourages the solid solubility and reaction of the various species present.

Secondary products are more commonplace when the reactant particles are so large that lithium ions cannot penetrate the bulk and consummate the reaction. As a result, those skilled in the art restrict the average reactant particle size to less than 100 microns. The manganese oxide average particle size is preferably less than 25 microns, and optimum results are obtained when the manganese oxide average particle size is less than 10 microns. If the oxide of the trivalent metal or metals utilized are less reactive than manganese oxide, the trivalent metal oxide average particle size must be less than that of the manganese oxide or the overall reaction will proceed too slowly for practical purposes.

The cathode intercalation compositions of the present invention having the formula and description set forth above exhibit a spinel crystal structure containing microdispersed crystallites of $M_2O_3$. Such a composition is preferably prepared by dry mixing the lithium, manganese and trivalent metal salts or oxides in a predetermined stoichiometric ratio, introducing the reactant mixture into a reactor, preferably a rotary kiln, heating the reactant mixture in the reactor while continuously agitating the reactant in an oxidizing atmosphere, preferably in an oxidizing atmosphere containing at least 20% oxygen, at a temperature in the range of from about 550° C. to about 850° C. for a time period of up to about 48 hours and then gradually cooling the reacted product formed in the reactor to a temperature of less than about 500° C. before removing the product from the reactor. Thereafter, the product is cooled further to ambient temperature and milled or classified to the desired particle size. The product is characterized by a tap density greater than about 1.3 grams per cubic centimeter, a BET surface area less than about 2 square meters per gram, an average particle size less than about 50 microns and high reversible capacity coupled with low capacity fade. The cathode intercalation compositions of this invention provide long operating lifetimes while retaining greater than 80% of their initial discharge capacity at high temperatures when used in secondary rechargeable lithium batteries.

The improved rechargeable lithium batteries provided by this invention are basically comprised of a lithium ion receptive anode and a lithium intercalation cathode coupled together in an electrochemical cell housing by an electrolyte containing an electrolytically stable lithium salt. The lithium intercalation cathode is comprised of a composition of this invention having a spinel structure with crystallites of $M_2O_3$ dispersed throughout the structure, the composition having the general formula $Li_{1+x}M_yMn_{2-x-y}O_4$ wherein x is a number greater than 0 but less than or equal to 0.25, M is one or more trivalent metals, y is a number greater than 0 but less than or equal to 0.5 and a portion of M is in the crystallites of $M_2O_3$.

The lithium ion anode is typically a carbonaceous material capable of intercalating lithium, i.e., carbon or doped carbon, but it may be formed of metal oxide materials capable of similar behavior or lithium metal or lithium alloys or intermetallic metals. The electrolyte is comprised of a lithium salt which is stable above 4 volts. Such salts include, but are not limited to lithium hexafluorophosphate, lithium tetrafluoroborate, lithium perchlorate, lithium hexafluoroarsenate, lithium imide, lithium methide and derivatives of the foregoing salts. The electrolyte can further include a carrier for the salt or salts including, but not limited to, organic solvents which are stable above 4 volts, polymers which are stable above 4 volts and mixtures thereof. The organic solvents which are useful include, but are not limited to, organic carbonates, organic ethers, organic esters, organic sulfones and mixtures of such solvents.

In addition to the active intercalation composition of this invention, the cathode of the battery generally includes a carbonaceous conductive agent and a binder such as a fluorinated polymer. However, there are many other cathode components which can be utilized in combination with the active intercalation composition which are well known to those skilled in the art. The battery can also include other components such as current collectors under the anode and cathode, a non-reactive case enclosing the battery's system and other components which are consistent in function with the art.

The design of relevant batteries has been previously described by Thackeray et al. in U.S. Pat. No. 5,240,794 issued on Aug. 31, 1993 and U.S. Pat. No. 5,316,877 issued on May 31, 1994, by Gozdz et al. in U.S. Pat. No. 5,296,318 issued on Mar. 22, 1994 and U.S. Pat. No. 5,460,904 issued on Oct. 24, 1995 and by Miyasaka in U.S. Pat. No. 5,869,208 issued on Feb. 9, 1999, all of which are incorporated herein by reference. The designs and variations of such rechargeable batteries are well known to those skilled in the art.

In order to further illustrate the cathode intercalation compositions of this invention, the methods of preparing the compositions and secondary rechargeable lithium batteries including the compositions, the following examples are given.

In the examples, the weights of the reactants were determined from elemental assays, not theoretical compositions. For all of the examples, $Mn_2O_3$ was prepared by heat treating electrolytic $MnO_2$ to a temperature in the range of from about 600° C. to about 750° C. in air, except as noted. Discharge capacities, $cap_d$ were calculated from the expression $cap_d=cap_t (1-3x-y) (mw_s/mw_{ms})$ where $cap_t$ is the theoretical capacity of $LiMn_2O_4$, i.e., 148.2 mAh/g, x and y are defined in the formula of the cathode intercalation composition of this invention and $mw_s$ and $mw_{ms}$ are the molecular weights of $LiMn_2O_4$, i.e., 180.813 grams, and the modified spinel, i.e., the intercalation cathode composition, respectively. The above expression assumes M is a trivalent metal cation.

Cathodes were prepared in an argon atmosphere by micronizing a mixture of 60% of the active intercalation composition to be tested, 35% graphite conductor and 5% of a polymer binder (PVDF or PTFE), all by weight of the mixture. Approximately 7 milligrams of the cathode mixture was then compressed at 9,000 psig into a cathode disk. The cathode disc was mounted on a graphite disc (current collector), which in turn was backed by aluminum foil, all of which was placed in the bottom half of a coin cell. One or more polymeric separators were placed between the cathode and a lithium foil anode and the volume between the separators was filled with electrolyte (1M of LiPF6 in a 1:1 mixture of ethylene carbonate/dimethylcarbonate). After the top of the cell was set in place, the cell was crimp sealed and secured in a computer controlled battery cycler. The cycling regime utilized was typically 50 charge/discharge cycles each approximately 3.5 hours in duration over a 3.0–4.3 volt range.

A chemical measure of cathode material robustness used heretofore is the manganese leach test. This test is performed by mixing one gram of the test cathode composition with 10 grams of lithium hexafluorophosphate electrolyte solution and holding the mixture at a constant 60° C. for one week with one stirring daily. The solution is then analyzed for manganese content. It is widely held that the cathode spinel composition stability is approximately measured by the amount of manganese leached from the lattice. That is, lower manganese concentrations in the leachate indicate lower capacity fades when the cathode composition is utilized in a rechargeable battery. This conclusion, however, is only semi-quantitative, based on our test results.

With the exception of stoichiometric lithium manganese oxide ($LiMn_2O_4$), all of the unmodified cathode materials tested in the manner described above revealed less than 250 parts per million manganese in the electrolyte. Further, the aluminum modified spinels leached less than 100 ppm, and generally, 40–60 ppm, into the electrolyte. Based on the disparity of fade rates shown in Table III and IV below, it is apparent there is at least a second mechanism which causes capacity fade. Nevertheless, the manganese leach test appears to be a qualitatively viable test for lithium manganese oxide spinels that include other trivalent metals, but may be less than reliable for spinels containing varying levels of unreacted $Mn_2O_3$. This impurity creates lattice dislocations and thereby diminishes cathode performance and increases susceptibility to acid-assisted metathesis ($2Mn^{+3} \rightarrow Mn^{+2} + Mn^{+4}$) resulting in soluble $Mn^{+2}$.

The four grades of lithium manganese oxide spinel shown in Table I below were produced in a semi-works plant and contain stoichiometric excesses of lithium, but they do not contain trivalent metal modifiers. For each grade, $Li_2CO_3$ and $Mn_2O_3$ were blended in a rod mill for 2 to 4 hours and the mixture was fed into a rotary kiln operated at up to 5 rpm with a throughput of up to 50 kilograms per hour. The maximum temperature was 750° C. with a dwell time of 2 hours and air flow at 2 cubic feet per minute. The cooling ramp was approximately 1° C. per minute until 500° C. was reached. The product was milled and/or classified as required to remove submicron particles and particles having sizes greater than 70 microns. The four grades of lithium manganese oxide spinel are identified in Table I by the letters A, B, C and D, and they are the standards against which the improved spinel compositions of the present invention were compared. The x-ray diffraction pattern shown in FIG. 1 of standard composition C is typical of the standard compositions, showing scattering signals consistent with single-phase lithium manganese oxide.

TABLE I

Reactant Weights for Semi-Commercial Lithium Manganese Oxide

| Standard Designation | Composition | $Li_2CO_3$, kg | $Mn_2O_3$, kg |
|---|---|---|---|
| A | $Li_{1.035}Mn_{1.965}O_4$ | 56.9 | 229.1 |
| B | $Li_{1.05}Mn_{1.95}O_4$ | 27.7 | 108.9 |
| C | $Li_{1.07}Mn_{1.93}O_4$ | 28.1 | 108.9 |
| D | $Li_{1.07}Mn_{1.91}O_4$ | 28.4 | 107.5 |

EXAMPLE 1

Stoichiometric $LiMn_2O_4$ was prepared by first intimately mixing 2,000 grams of $Mn_2O_3$ with 462.9 grams of $Li_2CO_3$. The reaction mixture was ramped at 2° C. per minute to 750° C. and calcined at that temperature for 16.67 hours in a box furnace under flowing air at 2 standard cubic feet per hour. The partially reacted mass was cooled to room temperature, remixed with little reduction of particle size, reheated and recalcined as before. Final cooling was at 0.9° C. per minute to ambient temperature. The stoichiometric $LiMn_2O_4$ produced was tested for initial capacity, capacity fade rate and lattice constant. The results of these tests are set forth in Table IV below.

The standard semi-commercial lithium manganese oxide compositions of Table I as well as the stoichiometric $LiMn_2O_4$ produced in Example 1 above along with the test compositions produced in the various examples which follow are set forth in Table IV below along with the electrochemical and physical test results obtained. As can be seen in Table IV, the standard semi-commercial grades of $Li_{1+x}Mn_{2-x}O_4$ (designated A, B, C and D) exhibit acceptable initial discharge capacities and fair to good capacity fade rates. These standard lithium manganese oxide spinels containing excess lithium were superior to the stoichiometric $LiMn_2O_4$ of Example 1. After only 20 cycles, the stoichiometric spinel of Example 1 supplies 120.9 mAh/g while composition C of the standard spinels supplies 121 mAh/g. This disparity is even more exaggerated at high temperature (55° C.) cycling as shown in Table III below. That is, it can be seen from Table III, that the fade rates increased by a factor of 1.5 to 3 as compared to the fade rates at ambient temperature given in Table IV. These results are normal, i.e., decreased capacities and reduced fade rates with increased lithium content is the norm for lithium manganese oxide spinel compositions.

EXAMPLE 2

100 grams of stoichiometric $LiMn_2O_4$ having an average particle size of 25 microns was blended with 1.62 grams of powdered $LiOH.H_2O$ and 0.28 grams of $\alpha\text{-}Al_2O_3$ having submicron particle size. The mixture was heated at 1° C. per minute to 500° C. for a 6 hour soak. The mixture was then further ramped at 1° C. per minute to 750° C. and calcined at that temperature for 16.67 hours in a box furnace under flowing air at 2 standard cubic feet per hour. The partially reacted mass was cooled to room temperature, remixed with little reduction of particle size, reheated and recalcined for an additional 16.67 hours. The product, $Li_{1.046}Al_{0.02}Mn_{1.934}O_4$ was cooled at 0.9° C. per minute to ambient temperature. The product was tested as described in Example 1 and also for tap density and surface area, the results of which are shown in Table IV below.

Previous work with $LiOH.H_2O$ indicates that this salt, as the molten anhydride at 500° C. infuses $LiMn_2O_4$ and acts as a carrier for the metal dopant, aluminum. No trace of unreacted $Al_2O_3$ or side products was noted in x-ray diffraction patterns of the product. The x-ray diffraction patterns exhibited the expected peak shifts to higher $2\theta$ angles as the cubic lattice shrank. Note in Table IV below that the discharge capacity of the Example 2 product is higher and the capacity fade rate lower than standard B which has a very similar Li:metal ratio. Further, the measured capacity of 128 mAh/g is 0.9 mAh/g above the calculated theoretical value, while standard B yielded a capacity 5.7 mAh/g less than calculated.

EXAMPLE 3

50 grams of $Mn_2O_3$, 11.94 grams of $Li_2CO_3$ and 1.51 grams of submicron size $TiO_2$ where mixed and heated at 1° C. per minute to 750° C. under air flowing at 2 standard cubic feet per minute. After 16.67 hours of reaction, the product was cooled, remixed, ramped at 2° C. per minute to 750° C. and calcined for another 16.67 hours. Final cooling was at 0.9° C. per minute to ambient. The produced product was nominal $Li_{1.007}Mn_{1.933}Ti_{0.06}O_4$. Analysis of the x-ray defraction pattern showed a large lattice constant (8.252 Å) and a $Mn_3O_4$ impurity, both known indicators of poor capacity fade characteristics. The product was not cycle tested.

EXAMPLES 4–13

Two matrices of $Li_{1+x}Al_yMn_{2-x-y}O_4$ cathode compositions were prepared by blending the reactants and heating and calcining in two steps as described in Example 2 above except that the air flow was 3 standard cubic feet per hour. The calculated compositions and weights of starting materials are given in Table II below.

TABLE II

Reactant Weights For Aluminum Modified Lithium Manganese Oxide Spinels

| Example No. | Composition | $Mn_2O_3$, g | $Li_2CO_3$, g | $\alpha\text{-}Al_2O_3$, g |
|---|---|---|---|---|
| 4 | $LiAl_{0.05}Mn_{1.95}O_4$ | 50.0 | 11.89 | 0.81 |
| 5 | $LiAl_{0.075}Mn_{1.925}O_4$ | 50.0 | 12.05 | 1.23 |
| 6 | $LiAl_{0.125}Mn_{1.875}O_4$ | 50.0 | 12.37 | 2.11 |
| 7 | $LiAl_{0.15}Mn_{1.85}O_4$ | 100.0 | 25.02 | 5.14 |
| 8 | $LiAl_{0.2}Mn_{1.8}O_4$ | 100.0 | 25.72 | 7.04 |
| 9 | $Li_{1.046}Al_{0.049}Mn_{1.906}O_4$ | 50.0 | 12.66 | 0.81 |
| 10 | $Li_{1.046}Al_{0.073}Mn_{1.881}O_4$ | 50.0 | 12.83 | 1.23 |
| 11 | $Li_{1.046}Al_{0.122}Mn_{1.832}O_4$ | 50.0 | 13.17 | 2.11 |
| 12 | $Li_{1.046}Al_{0.147}Mn_{1.808}O_4$ | 100.0 | 26.78 | 5.14 |
| 13 | $Li_{1.046}Al_{0.195}Mn_{1.759}O_4$ | 100.0 | 27.52 | 7.04 |

Figure 2:
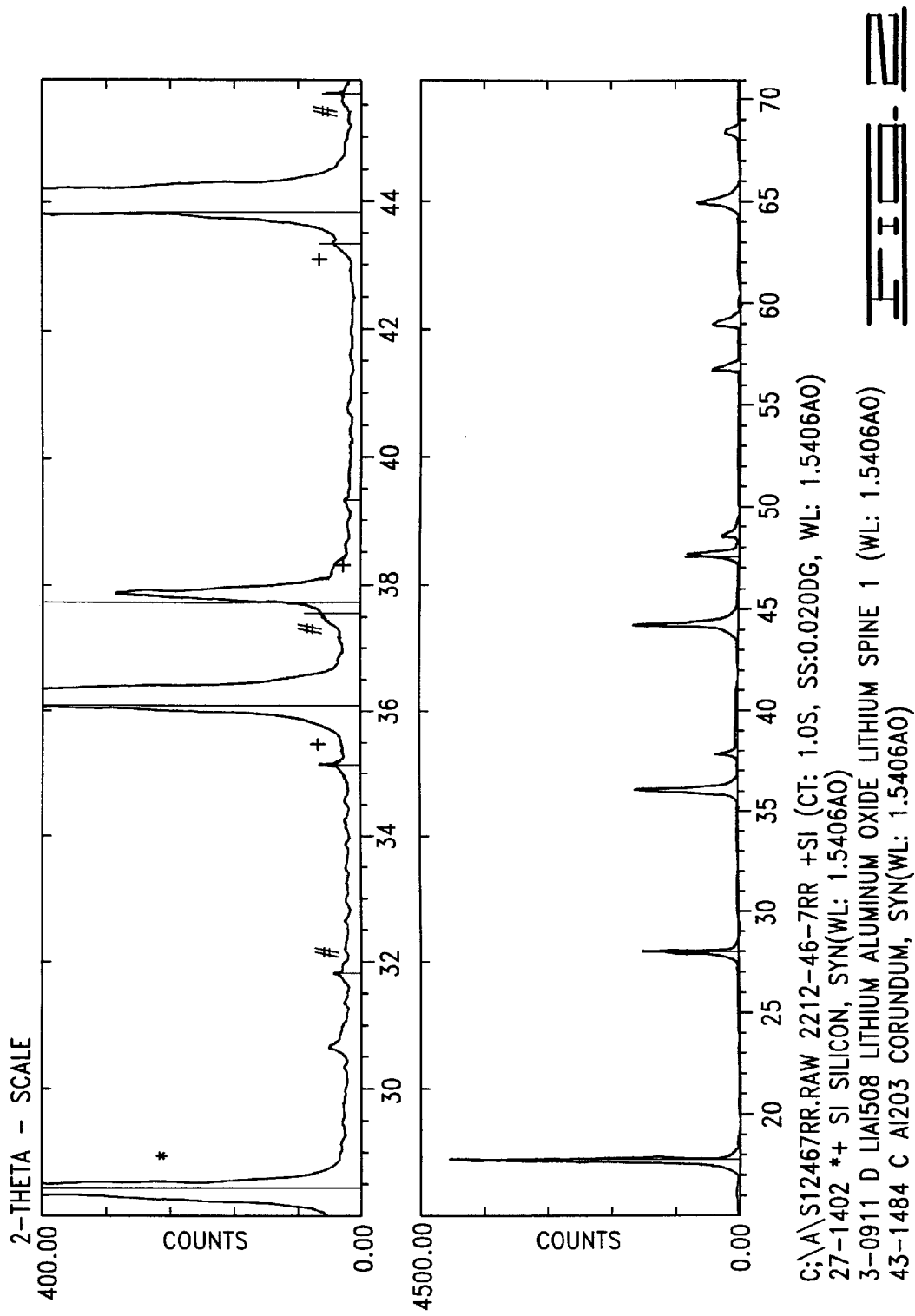
FIG. 2 is an x-ray diffraction pattern of the spinel composition of this invention described in Example 7 having the formula $LiAl_{0.15}Mn_{1.85}O_4$ (and having the properties set forth in Tables III and IV) in which the vertical lines are computer generated positions for Si (an internal standard designated by the symbol *), $\alpha$-$Al_2O_3$ (designated by the symbol +), $LiAl_5O_8$ (designated by the symbol #) and stoichiometric $LiMn_2O_4$.

Examples 4–8 are a subgroup of aluminum modified spinels which are stoichiometric with regard to lithium. Table IV below clearly shows the expected trends from increasing aluminum content, i.e., lower initial capacity, less capacity fade and shrinking lattice constant. The x-ray diffraction pattern of Example 7 shown in FIG. 2 reveals not only the expected $LiAl_{0.15}Mn_{1.85}O_4$ spinel pattern, but also $\alpha\text{-}Al_2O_3$ and $LiAl_5O_8$ impurities (both are spinels). This latter species is a solid solution of $LiAlO_2$ and $\delta\text{-}Al_2O_3$. Both $Al_2O_3$ phases are typically found in the Al-containing Examples after Rietveld refinement of the diffraction data.

Although examples 4, 5 and 6 exhibit fade rates too high for commercial batteries, examples 7 and 8 which contain 7.5% and 10% manganese replacement by aluminum, respectively, result in cathode intercalation compositions having competitive electrolytic cell performance as compared to standards C and D. The exchange of manganese with less costly aluminum in Examples 7 and 8 makes them more attractive. The calculated capacities of Examples 4–8 range from 142 to 122 mAh/g indicating that measured values are substantially better than expected on the basis of the performance of the standard cathode compositions.

Examples 9–13 are related to standard B and have 2.5% to 10% of the manganese replaced with aluminum. The same trends with initial capacity, capacity fade and lattice constant are observed as with Examples 4–9 although the excess lithium reduces the capacity, fade and lattice values of Examples 9–13 as compared to Examples 4–8. This is most beneficial with regard to the capacity fade rates. For example, Example 13 will retain 80% of its initial discharge capacity (which is the battery industries end of life battery standard) past 1,000 cycles. The calculation is based on the expression $cap_n/cap_i=(R)^n$ where $cap_i$ and $cap_n$ are the capacities of the initial and nth discharge cycle, R is the fade rate determined graphically and n is the cycle number. In the calculation $cap_n/cap_i$ was set at 0.8 and the number of cycles n was determined. Although the capacities of Examples 9–13 are somewhat lower than the capacities of Examples 4–8, the observed capacities of Examples 9–13 exceed the calculated theoretical capacities. The extremes are Example 9 which has a calculated capacity of 123.4 mAh/g while 128 mAh/g was observed and Example 13 which has a calculated capacity of 103.5 mAh/g and an observed capacity of 111 mAh/g. All of the aluminum modified spinels with a stoichiometric excess of lithium have observed functional capacities above the calculated capacities. Further, the capacities demonstrated in Examples 4–11 are equivalent to or exceed those of the semi-commercial standards, and all of the Examples show improved capacity fade rates.

A comparison of capacity fade rates from Examples 4–8 v. 9–13 reveals the synergistic affect of the trivalent aluminum modifier with a stoichiometric excess of lithium. The capacity fade rates are reduced by as much as a factor of 5. This phenomenon is attributed to the fluxing action of excess $Li_2O$ facilitating the formation of $Al_2O_3/LiMn_2O_4$ solid solution and subsequent reaction to produce the $Li_{1+x}Al_yMn_{2-x-y}O_4$ species. This effect is especially noticeable when a gallium cation modifier is utilized as in Examples 19 and 20 described hereinbelow, the results of which are shown in Table IV below. Gallium oxide is very refractory and slow to react and the stoichiometric excess of $Li_2O$ is essential for incorporation of gallium in the lithium manganese oxide lattice.

EXAMPLE 14

40 grams of $Mn_2O_3$, 10.1 grams of $Li_2CO_3$ and 0.27 grams of ruthenium oxide ($RuO_2$) were blended, heated at 1° C. per minute to 745° C. and calcined at that temperature for 16.67 hours in a box furnace under flowing air at 2 standard cubic feet per hour. The partially reacted mass was cooled to room temperature, remixed and the material was heated at 2° C. per minute to 745° C. and calcined at that temperature for an additional 16.67 hours. The product, $Li_{1.062}Ru_{0.008}Mn_{1.930}O_4$, was cooled at 0.9° C. per minute to ambient temperature.

EXAMPLE 15

40 grams of $Mn_2O_3$, 10.23 grams of $Li_2CO_3$ and 0.51 grams of $RuO_2$ were prepared identically as disclosed in Example 14 above to produce $Li_{1.071}Ru_{0.015}Mn_{1.914}O_4$.

The ruthenium-doped spinel compositions of Examples 14 and 15 had capacities in the same range as standards A–D, although each exhibited approximately 1 mAh/g greater capacity than the calculated capacity. The capacity fade was slightly improved by the inclusion of ruthenium. Although a slight improvement is observed, the high cost of ruthenium oxide precludes its commercial use in lithium manganese oxide cathode compositions.

EXAMPLE 16

100 grams of $Mn_2O_3$, 26.42 grams of $Li_2CO_3$ and 7.81 grams of chromium oxide ($Cr_2O_3$) were blended, heated and calcined in two steps as described in Example 2 except that the air flow was 3 standard cubic feet per minute. The resulting product was $Li_{1.046}Cr_{0.122}Mn_{1.832}O_4$.

EXAMPLE 17

100 grams of $Mn_2O_3$, 24.69 grams of $Li_2CO_3$ and 7.81 grams of $Cr_2O_3$ were blended, heated and calcined in two steps as described above in Example 16. The resulting product was $LiCr_{0.125}Mn_{1.875}O_4$.

EXAMPLE 18

100 grams of $Mn_2O_3$, 25.73 grams of $Li_2CO_3$ and 4.57 grams of $Cr_2O_3$ were blended, heated and calcined in two steps as described above in Example 16. The resulting product was $Li_{1.046}Cr_{0.073}Mn_{1.881}O_4$.

The chromium ion modified lithium manganese oxide spinel compositions of Examples 16 and 18 are the analogs of aluminum-containing Examples 11 and 6, respectively, and it is instructive to compare the cycling and x-ray defraction results given in Table IV. The unit cell dimension is slightly larger with trivalent chromium in the lattice which is expected since trivalent aluminum is a smaller cation than the chromium cation. The capacity fade of $LiCr_{0.125}Mn_{1.875}O_4$ of Example 17 is unusually low in view of the relatively large $a_o$ (8.238 Å). Further, when coupled with excess lithium as in Example 16, the spinel composition has an extrapolated battery life exceeding 2,000 cycles. Note that the chromium cation modifier (Example 16) causes lower observed capacity relative to aluminum (Example 11) but the composition containing chromium still has an observed capacity approximately 4 mAh/g better than its calculated capacity.

EXAMPLE 19

30 grams of $Mn_2O_3$ (made by thermally decomposing $MnCO_3$ in air), 8.24 grams of $Li_2CO_3$ and 0.35 grams of gallium oxide ($Ga_2O_3$) were blended and then heated at 1° C. per minute to 745° C. and calcined at that temperature for 16.7 hours. After cooling and remixing the material was ramped at 2° C. per minute to 745° C. and calcined at that temperature for an additional 16.7 hours. The heating and calcining was performed in a box furnace under flowing air at 2 standard cubic feet per hour. The resulting product was $Li_{1.108}Ga_{0.01}Mn_{1.882}O_4$.

EXAMPLE 20

1.30 grams of $Ga(NO_3)_3.6H_2O$ was dissolved in 100 milliliters of methanol and 50 grams of $Mn_2O_3$ was added to the solution. The resulting slurry was dried by rotary evaporation and the Ga infused powder obtained was blended with 12.86 grams of $Li_2CO_3$ and 0.83 grams of $Al_2O_3$. The blend was heated at 1° C. per minute to 750° C. under air flowing at 2 standard cubic feet per hour. After calcining for 16.67 hours, the product was cooled, remixed and ramped at 2° C. per minute to 750° C. and calcined at that temperature for another 16.67 hours after which the product was cooled at 0.9° C. per minute to ambient temperature. The resulting product was $Li_{1.046}Al_{0.049}Ga_{0.01}Mn_{1.895}O_4$. X-ray diffraction of the product revealed a phase-pure spinel composition.

EXAMPLE 21

7.1 grams of $Ga(NO_3)_3.6H_2O$ was infused in 50 grams of $Mn_2O_3$ in the same manner as described in Example 20 above. The resulting powder was blended with 11.99 grams of $Li_2CO_3$ and reacted as described in Example 20 to produce $LiGa_{0.03}Mn_{1.97}O_4$.

EXAMPLE 22

2.32 grams of $Ga(NO_3)_3.6H_2O$ infused into 50 grams of $Mn_2O_3$ as described in Example 20. The dried powder was blended with 12.27 grams of $Li_2CO_3$ and reacted in accordance with the procedure described in Example 20. The resulting product was $Li_{1.033}Ga_{0.01}Mn_{1.957}O_4$.

Figure 3:
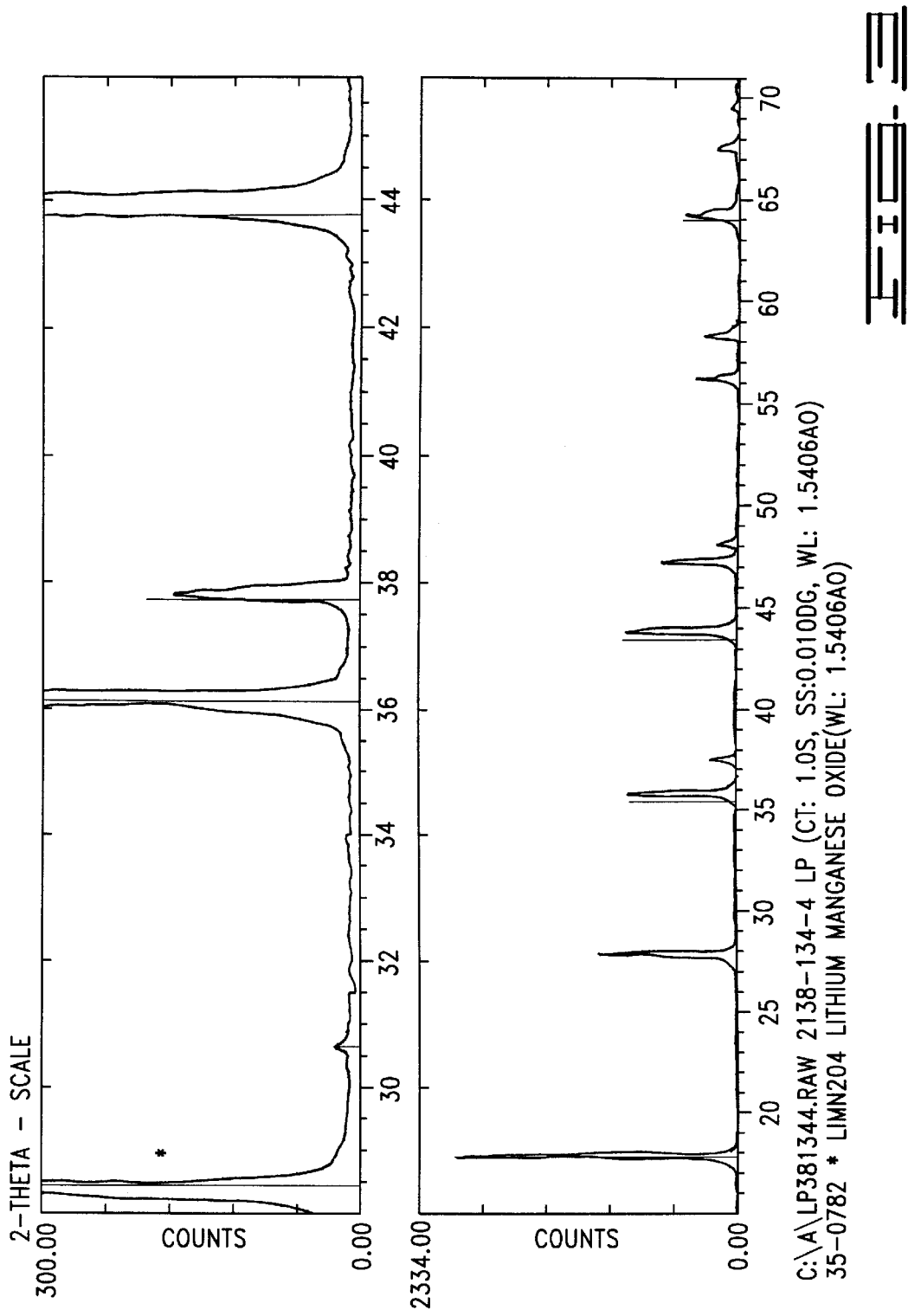
FIG. 3 is an x-ray diffraction pattern of the spinel composition of this invention described in Example 22 having the formula $Li_{1.033}Ga_{0.01}Mn_{1.957}O_4$ (and having the properties set forth in Tables III and IV) in which the vertical lines are computer generated positions for Si (symbol *) and stoichiometric $LiMn_2O_4$.

As shown in Table IV below, gallium ion has an extreme effect on the spinel lattice constant. That is, very small amounts of gallium dopant, especially with excess lithium, cause extreme lattice shrinkage. This attribute is associated with, but does not guarantee, reduced capacity fade rates. FIG. 3 is the x-ray diffraction pattern of Example 22. Note the apparently phase-pure material exhibits substantial x-ray peak shifts from stoichiometric $LiMn_2O_4$.

EXAMPLE 23

100 grams of $Mn_2O_3$ and 29.26 grams of $Li_2CO_3$ were blended with 8.81 grams of $\alpha$-$Al_2O_3$, and processed identically as described in Example 1 to yield $Li_{1.065}Al_{0.232}Mn_{1.703}O_4$.

EXAMPLE 24

100 grams of $Mn_2O_3$ and 30.30 grams of $Li_2CO_3$ were blended with 10.40 grams of $\alpha$-$Al_2O_3$, and processed identically as described in Example 1 to yield $Li_{1.065}Al_{0.290}Mn_{1.645}O_4$.

Statistical analysis of previous Al-modified spinel cycling results indicated that relatively high Li- and Al-content spinels would have extremely low fade characteristics. Both of the Al-modified spinels of Examples 23 and 24 exhibited 55° C. fade rates (Table III) nearly a factor of 5 better than any other Al-modified material. As expected, capacities were quite low, but still greater than 10% above theoretical values (Table IV), and x-ray diffraction revealed the presence of both defect spinel phases of $Al_2O_3$.

TABLE III

55° C. Cycling Data For Standard And Metal Cation Modified Spinels

| Example # | Capacity, mAh/g | Capacity Fade, %/Cycle | # of Cycles |
|---|---|---|---|
| A | 121 | 0.43 | 50 |
| B | 133 | 0.45 | 50 |
| C | 127 | 0.22 | 50 |
| D | 118 | 0.16 | 50 |
| 1 | 137 | 1.3 | 50 |
| 6 | 132.5 | 0.45 | 50 |
| 7 | 125 | 0.32 | 70 |
| 9 | 128 | 0.19 | 138 |
| 10 | 126.5 | 0.12 | 50 |
| 11 | 118 | 0.06 | 50 |
| 12 | 116.5 | 0.11 | 71 |
| 18 | 119 | 0.065 | 59 |
| 20 | 129 | 0.21 | 92 |
| 21 | 108 | 0.081 | 138 |
| 22 | 119 | 0.10 | 68 |
| 23 | 99.2 | 0.029 | 41 |
| 24 | 91.8 | 0.033 | 44 |

TABLE IV

Room Temperature Cycling And Analytical Data For Standard And Metal Cation Modified Spinels

| Standard Letter or Example Number | Capacity, mAh/g Obs. | Calc. | Capacity Fade, %/cycle (#) | $a_0$, A | Tap Density, g/cc | Surface Area, $m^2/g$ | Rietveld Impurities |
|---|---|---|---|---|---|---|---|
| A | 120 | 133.9 | 0.10(50) | 8.239 | 2.40 | 0.5 | None |
| B | 122 | 127.7 | 0.11(50) | 8.229 | 2.32 | 0.46 | None |
| C | 123 | 119.3 | 0.08(50) | 8.229 | 2.30 | 0.48 | None |
| D | 119 | 110.8 | 0.07(50) | 8.224 | 2.30 | 0.7 | |
| 1 | 131 | 148.2 | 0.4(50) | 8.246 | | | |
| 2 | 128 | 127.1 | 0.097(80) | 8.234 | 1.3 | 1.0 | |
| 3 | — | 136.8 | — | 8.252 | | | Trace $Mn_3O_4$, $TiO_2$ |
| 4 | 134.5 | 141.9 | 0.43(40) | 8.242 | | | |
| 5 | 131 | 138.7 | 0.25(120) | 8.242 | 1.0 | 1.3 | |
| 6 | 130.5 | 132.2 | 0.20(50) | 8.236 | 1.0 | 1.4 | No. |
| 7 | 125 | 129.0 | 0.09(85) | 8.232 | | | 1.4% $\alpha$-$Al_2O_3$, 3% $\gamma$-$Al_2O_3$ |
| 8 | 122 | 122.3 | 0.07(30) | 8.227 | | | $\gamma$-$Al_2O_3$ |
| 9 | 128 | 122.9 | 0.053(50) | 8.231 | 1.2 | 1.3 | no |
| 10 | 126 | 119.7 | 0.039(50) | 8.226 | 1.1 | 1.4 | 2.2%-$Al_2O_3$? |
| 11 | 121 | 113.2 | 0.028(50) | 8.222 | 1.5 | 1.4 | no |
| 12 | 116 | 109.8 | 0.06(100) | 8.211 | | | no |
| 13 | 111 | 103.2 | 0.022(52) | 8.209 | | | no |
| 14 | 122 | 121.2 | 0.10(64) | 8.226 | | | |
| 15 | 117 | 116.2 | 0.07(75) | 8.224 | 1.3 | 0.7 | |
| 16 | 116 | 111.2 | 0.011(42) | 8.228 | 1.2 | 0.7 | |
| 17 | 116 | 129.9 | 0.045(42) | 8.238 | | | |
| 18 | 121.5 | 118.5 | 0.074(85) | 8.234 | | | |
| 19 | — | 101.5 | — | 8.219 | 1.9 | 0.5 | |
| 20 | 119 | 120.6 | 0.038(62) | | | | |
| 21 | — | 143.4 | — | 8.218 | | | |
| 22 | — | 132.9 | — | 8.199 | | | |
| 23 | 98.4 | 89.7 | 0.019(41) | 8.200 | | 1.0 | 2–4% total $\alpha$ and $\gamma$-$Al_2O_3$ |
| 24 | 90.6 | 81.4 | 0.014(44) | 8.200 | | 1.2 | 2–4% total $\alpha$ and $\gamma$-$Al_2O_3$ |

As previously mentioned, cathode intercalation compositions for use in rechargeable lithium and lithium ion batteries must withstand operation and storage at temperatures up to 65° C. The desired operating standard is 250 cycles with 20% total capacity fade at 55° C., i.e., a capacity fade of 0.09% per cycle. It is apparent from Table III above that prior art augmented spinels having the formula $Li_{1+x}Mn_{2-x}O_4$ will not reach this standard. However, the cathode intercalation compositions of the present invention as illustrated by Examples 11, 18 and 21 in Table III above surpass the standard. Because of its high initial capacity, lower cost and lower perceived environment hazard, the composition of Example 11, i.e., $Li_{1.046}Al_{0.122}Mn_{1.832}O_4$, is preferred.

Thus, the present invention is well adapted to carry out the objects and attain the ends and advantages mentioned as well as those which are inherent therein. While numerous changes may be made by those skilled in the art, such changes are encompassed by the spirit of this invention as defined by the appended claims.

What is claimed is:

1. An intercalation composition having a spinel structure with crystallites of $M_2O_3$ dispersed throughout the spinel structure, said composition having the general formula $$Li_{1+x}M_yMn_{2-x-y}O_4$$

wherein:
x is a number greater than 0 but less than or equal to 0.25;
M is one or more trivalent metals;
y is a number greater than 0 but less than or equal to 0.5;
a portion of M is in said crystallites of $M_2O_3$; and
said crystallites have a size less than about 1000 Ångstroms.

2. The composition of claim 1 wherein M is one or more trivalent metals which do not have readily obtainable higher oxidization states.

3. The composition of claim 1 wherein M is selected from the group of trivalent metals consisting of aluminum, chromium, gallium, indium, scandium and two or more of said metals.

4. The composition of claim 1 wherein M is aluminum.

5. The composition of claim 1 wherein the tap density thereof is greater than or equal to 1.3 grams per cubic centimeter.

6. The composition of claim 1 wherein the BET surface area thereof is less than or equal to 2 square meters per gram.

7. The composition of claim 1 wherein said crystallites of $M_2O_3$ are detectable by x-ray diffraction analysis.

8. The composition of claim 1 wherein said crystallites of $M_2O_3$ have spinel characteristics.

9. A method of preparing an intercalation composition having a spinel structure with crystallites of $M_2O_3$ dispersed throughout the spinel structure, said composition having the general formula $$Li_{1+x}M_yMn_{2-x-y}O_4$$

wherein x is a number greater than 0 but less than or equal to 0.25, M is one or more trivalent metals, y is a number greater than 0 but less than or equal to 0.5, a portion of M is in said crystallites of $M_2O_3$ and said crystallites have a size less than about 1,000 Ångstroms, comprising the steps of:

(a) intimately mixing particulate solid reactants comprised of lithium, manganese and one or more of said trivalent metals in the form of oxides, thermally decomposable salts or mixtures thereof in amounts based on said intercalation composition formula;

(b) introducing the resulting intimately mixed reactants into a reactor;

(c) heating the mixed reactants in the reactor in air or an oxygen enriched atmosphere at a temperature in the range of from about 550° C. to about 900° C. for a time period of up to about 48 hours; and (d) gradually cooling the reacted product formed in step (c) to a temperature of less than about 500° C.

10. The method of claim 9 wherein the mixed reactants heated in the reactor in accordance with step (c) are continuously agitated during said heating.

11. The method of claim 9 wherein M is selected from the group of trivalent metals consisting of aluminum, chromium, gallium, indium, scandium and two or more of said metals.

12. The method of claim 9 wherein M is aluminum.

13. The method of claim 9 wherein said particulate solid reactants have an average particle size less than about 100 microns at the temperature to which said reactants are heated in step (c).

14. The method of claim 9 wherein said reactants are heated in accordance with step (c) at a temperature in the range of from about 650° C. to about 850° C.

15. The method of claim 9 wherein said reactants are heated in accordance with step (c) at a temperature in the range of from about 700° C. to about 800° C.

16. The method of claim 9 wherein said reactants are heated in accordance with step (c) in an atmosphere containing more than 20% by volume of oxygen.

17. The method of claim 9 wherein said reactants are heated in accordance with step (c) for a time period of less than about 10 hours.

18. The method of claim 9 wherein said reactants are heated in accordance with step (c) for a time period in the range of from about 2 hours to about 5 hours.

19. The method of claim 9 wherein said reacted product is cooled in accordance with step (d) in a time period in the range of from about 4 hours to about 6 hours.

20. The method of claim 9 which further comprises cooling said reacted product to a temperature of less than about 100° C.

21. The method of claim 9 wherein step (a) is carried out in a dry-blending apparatus.

22. The method of claim 21 wherein said apparatus is a rod mill.

23. The method of claim 21 wherein said apparatus is a ball mill.

24. The method of claim 9 wherein step (b) is carried out by a conveyor apparatus.

25. The method of claim 9 wherein said reactor is a rotary kiln.

26. An improved secondary rechargeable lithium battery comprised of a lithium ion receptive anode and a lithium intercalation cathode coupled together in an electrochemical cell housing by an electrolyte containing an electrolytically stable lithium salt, said lithium intercalation cathode being comprised of a composition having a spinel structure with crystallites of $M_2O_3$ dispersed throughout the structure, said composition having the general formula $$Li_{1+x}M_yMn_{2-x-y}O_4$$

wherein:
x is a number greater than 0 but less than or equal to 0.25;
M is one or more trivalent metals;
y is a number greater than 0 but less than or equal to 0.5;
a portion of M is in said crystallites of $M_2O_3$; and said crystallites have a size of less than about 1,000 Ångstroms.

27. The battery of claim 26 wherein M is one or more trivalent metals which do not have readily obtainable higher oxidization states.

28. The battery of claim 26 wherein M is selected from the group of trivalent metals consisting of aluminum, chromium, gallium, indium, scandium and two or more of said metals.

29. The battery of claim 26 wherein M is aluminum.

30. The battery of claim 26 wherein said composition has a tap density greater than or equal to 1.3 grams per cubic centimeter.

31. The battery of claim 26 wherein said composition has a BET surface area less than or equal to 2 square meters per gram.

32. The battery of claim 26 wherein said crystallites of $M_2O_3$ are detectable by x-ray diffraction analysis.

33. The battery of claim 26 wherein said crystallites of $M_2O_3$ have spinel characteristics.

34. The battery of claim 26 wherein said lithium ion receptive anode is comprised of a material capable of reversibly accepting lithium ions selected from the group consisting of carbon, doped carbon, metal oxides, lithium metal, lithium alloys and intermetallic metals.

35. The battery of claim 26 wherein said electrolyte is comprised of a lithium salt which is stable above four volts.

36. The battery of claim 35 wherein said lithium salt is selected from the group consisting of lithium hexafluorophosphate, lithium tetrafluoroborate, lithium perchlorate, lithium hexafluoroarsenate, lithium imide, lithium methide and derivatives of these salts.

37. The battery of claim 35 wherein said electrolyte further comprises a carrier for said salt selected from the group consisting of organic solvents which are stable at above four volts, polymers which are stable at above four volts and mixtures thereof.

38. The battery of claim 35 wherein said electrolyte further comprises a carrier for said salt comprised of a solvent selected from the group consisting of organic carbonates, organic ethers, organic esters, organic sulfones and mixtures thereof which are stable at above four volts.

* * * * *